United States Patent [19]

Braun et al.

[11] 4,114,490
[45] Sep. 19, 1978

[54] STRIP MATERIAL DIVIDING DEVICE

[75] Inventors: Hans Braun, Weilheim, Teck; Günter Cieslok; Franz Wolf, both of Göppingen, all of Germany

[73] Assignee: L. Schuler GmbH, Germany

[21] Appl. No.: 824,741

[22] Filed: Aug. 15, 1977

[30] Foreign Application Priority Data

Aug. 14, 1976 [DE] Fed. Rep. of Germany ....... 2636738

[51] Int. Cl.² .......................... B26D 1/28; B26D 1/56
[52] U.S. Cl. ........................................ 83/303; 83/100; 83/318; 83/530; 83/859
[58] Field of Search .................. 83/383, 318, 320, 527, 83/530, 859; 144/252 R

[56] References Cited

U.S. PATENT DOCUMENTS

| 2,228,162 | 1/1941 | Beuham et al. | 83/318 X |
| 3,859,881 | 1/1975 | Hawley et al. | 83/320 |
| 3,881,382 | 5/1975 | Rasenberger et al. | 83/305 |
| 3,921,484 | 11/1975 | Rasenberger | 83/320 |
| 3,964,357 | 6/1976 | Fetzer et al. | 83/318 |

Primary Examiner—Frank T. Yost
Attorney, Agent, or Firm—Craig & Antonelli

[57] ABSTRACT

A dividing apparatus for dividing, cutting, or severing a continuously running strip material with the apparatus including an articulated drive for effecting a stroke movement of a cutting unit. The articulated drive is constructed as a quadrangular linkage including a driven crank and a rocker lever pivotally connected to the driven crank through a coupling member. The rocker lever includes an extension portion extending beyond a pivotal connection of the coupling member with the rocker lever. A secondary drive lever is provided with a first end of a link member being pivotally connected with the secondary drive lever and a second end of the link member being pivotally connected with a free end of the extension portion of the rocker lever. A transmission link element is provided for moving the cutting unit with the transmission link element being adjustably connected with the secondary drive lever.

24 Claims, 6 Drawing Figures

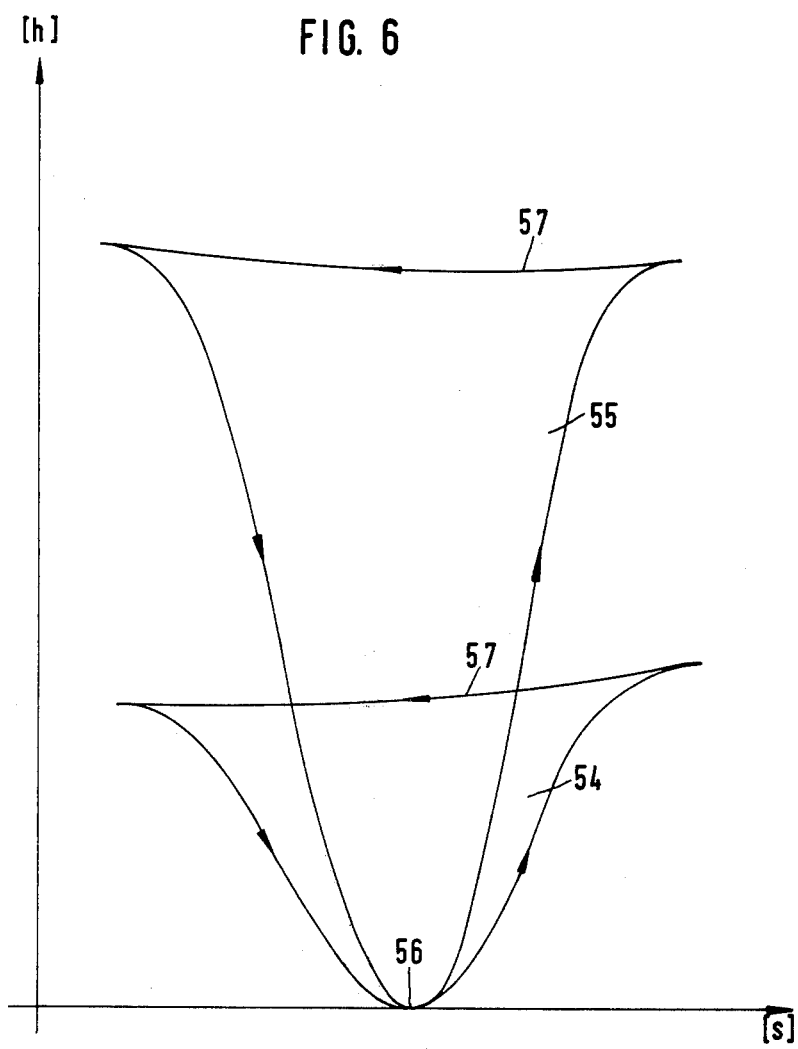

STRIP MATERIAL DIVIDING DEVICE

The present invention relates to a dividing apparatus for a continuously running strip of material which apparatus includes an articulated drive for a stroke movement having a quadrangular linkage employing a driven crank connected with a rocker arm or lever by way of a coupling means.

By the provision of an articulated drive arrangement, it is possible to produce drive coupling curves having a generally D-shaped configuration. Specifically, in technical journal "Feinwerktechnik, 1970," No. 10, page 438, in FIG. 52, the specific structure and dimensioning of the elements of a drive arrangement are described so as to produce the above-noted drive coupling curve.

Moreover, in German Pat. No. 908,223, a flying saw arrangement is provided which employs an articulated drive producing coupling curves of a generally D-shaped configuration with the saw being utilized to divide strip material having a small cross-sectional configuration such as, for example, the division of small pipes.

Additionally, for the division or cutting of continuously fed tubular materials, flying saws are disclosed, for example, in U.S. Pat. Nos. 1,946,926 and 2,232,013; however, neither of these flying saw constructions employ an articulated drive of the type described hereinabove.

One disadvantage of the known flying saws resides in the fact that it is not possible to divide laminar material such as mineral fibers, foamed material, glass, wood, etc., when such materials are continuously supplied because the required cutting stroke and the size of the saw blade that would be selected and employed would result in the known flying saws having a very low efficiency due to the conditions of the motion and acceleration of the flying saw.

For the dividing or cutting of laminar material, it is proposed, for example, in Offenlegungsschrift No. 2,148,246 to provide a saw carriage that supports the saw with the carriage being moved synchronously by positive force and with the strip of material to be divided with the severing or cutting process being effected by a lowering and a transverse motion of the saw with respect to the strip material. A disadvantage of this proposed construction resides in the fact that the saw is driven by racks and hydraulic cylinders so that it is not possible to achieve either great precision in cutting length or high efficiency.

The aim of the present invention essentially resides in providing a dividing or cutting apparatus with an articulated drive which will permit a division or separating of continuously fed laminar strip material with great precision as to the length of the material divided or cut as well as with a high degree of efficiency.

According to one feature of the present invention, a dividing apparatus is provided for continuously fed strip material wherein a driven crank is pivotally connected to a rocker arm by a coupling member with the rocker arm having an extension portion extending beyond the coupling point of the coupling member and the rocker arm. A length member is pivotally connected at one of its ends with a free end of the extension portion with a secondary drive lever being pivotally connected to the other end of the length member. A transmission link member is adjustably connected with the secondary drive lever and a cutting unit with the transmission link member selectively moving the cutting unit. The rocker arm, extension portion, and the link member assume an extended or maximally displaced position over a first approximately 180° segment of the driven crank with the rocker arm, extension portion, and the link member being deflected from the extended position over a second approximately 180° segment of the driven crank and, during the total crank angle, the rocker arm, extension portion, link member, and secondary drive lever can be moved out of a range of the extended position.

According to a further advantageous feature of the present invention, the secondary drive lever may be fashioned as either a single or double-armed lever and, if fashioned as a double-armed lever, may be connected with the transmission link member by way of a further double-armed lever and a translation link member.

Preferably, according to the present invention, an arm of the further double-armed lever which faces away from the connection thereof with the translation of the link is adjustably connected with the transmission link member.

According to yet another feature of the present invention, a three-armed lever is provided with at least two of the arms being provided with cam followers cooperating with cam means associated with the driving mechanism with the third arm being connected to a cutting unit disposed on a carriage. The three-armed lever, cam followers, and cam means effect a forward and backward stroke of the cutting unit.

The cutting unit, according to the present invention, is movably guided in the carriage on guide strips that extend vertically with respect to a conveying level of the strip material with the carriage being guided so as to be horizontally movable above the conveying level on guide rolls.

In accordance with another feature of the present invention, the driven crank and cam means are connected so as to be fixed in rotation with a common driven shaft.

To prevent contamination of the driving elements by the dividing or severing elements of the apparatus, according to a further feature of the present invention, a partition member is arranged in a housing of the apparatus so as to divide the housing into a work compartment accommodating the cutting unit and a drive compartment accommodating the drive elements.

Openings or holes are provided in predetermined positions of the partition to permit at least one arm of the three-armed lever and the transmission link member to extend therethrough with bellows or accordion-like covers surrounding the arm of the three-armed lever and the transmission link.

According to yet another feature of the present invention, all guides and guide rolls are provided for movably mounting the carriage unit with bellows or accordion-like sleeves surrounding the ball guides, guide rolls, and guide strips and with the sleeves being connected with the carriage.

Preferably, according to the present invention, the cutting unit is driven by way of a suitable gear train and electric motors which are symmetrically disposed with respect to the carriage mounting the cutting unit.

According to still another advantageous feature of the present invention, the drive compartment is constructed so that an excess pressure may be built up therein, thereby protecting the drive compartment from the penetration of waste materials therein, which waste material results from the severing or cutting process and which would lead to a contamination of the drive elements.

By virtue of the constructional features of the dividing apparatus according to the present invention, it is possible to obtain an optimal stroke of the cutting unit with a further advantage being that the stroke of the cutting unit is variable in such a way that, with an approximately uniform lower reversal point, the upper reversal point of the cutting unit may be continuously adjusted so that, in a simple and advantageous way, it is possible to have an adaption of the cutting unit stroke to the thickness of the material that is to be divided or cut.

To provide for the forward and backward stroke motion of the cutting unit, the articulated drive of the invention is combined with a construction such as disclosed, for example, in U.S. Pat. No. 3,964,357 whereby a three-armed lever is pivotally mounted at a fixed point with one arm of the lever being connected with the cutting unit and with the other two arms, disposed at an angle with respect to each other, each having mounted thereon a roll or cam follower which is continuously applied to one of two cams that are fixed in rotation with a common drive shaft. The cams, in the direction of rotation, are provided with successive peripheral segments with increasing, uniform and decreasing enlargements or protrusions, and increasing or decreasing reductions of the effective radii.

Preferably, the driven crank of the articulated drive and the commonly rotatable cams are disposed on a common rod and are driven by a common shaft. By virtue of this arrangement, a reliable, positive coupling of the forward and backward stroke and the working stroke of the cutting unit is ensured. Moreover, with the above-described arrangements of the articulated drive, a bell curve motion is obtained thereby increasing the overall efficiency in the operation of the dividing apparatus of the present invention.

Accordingly, it is an object of the present invention to provide a dividing apparatus for continuously moving strip material which avoids by simple means drawbacks and disadvantages encountered in the prior art.

A further object of the present invention resides in providing a dividing apparatus for continuously moving strip material which is capable of dividing or cutting laminar material to predetermined lengths with high precision and efficiency.

Yet another object of the present invention resides in providing a dividing apparatus for continuously moving strip material in which the working stroke of the cutting unit may be continuously and simply adjusted to accommodate strip material of various thicknesses.

A further object of the present invention resides in providing a dividing apparatus for continuously moving strip material in which the drive elements and work elements are arranged in a housing in such a manner that a contamination of the drive elements by the waste provided during a cutting operation by the work elements is prevented.

These and other objects, features, and advantages of the present invention will become more apparent from the following description when taken in connection with the accompanying drawings which show, for the purposes of illustration only, several embodiments in accordance with the present invention, and wherein:

FIG. 6 is a diagram of motion curves of the articulated drive during various strokes of a cutting unit.

Figure 1:
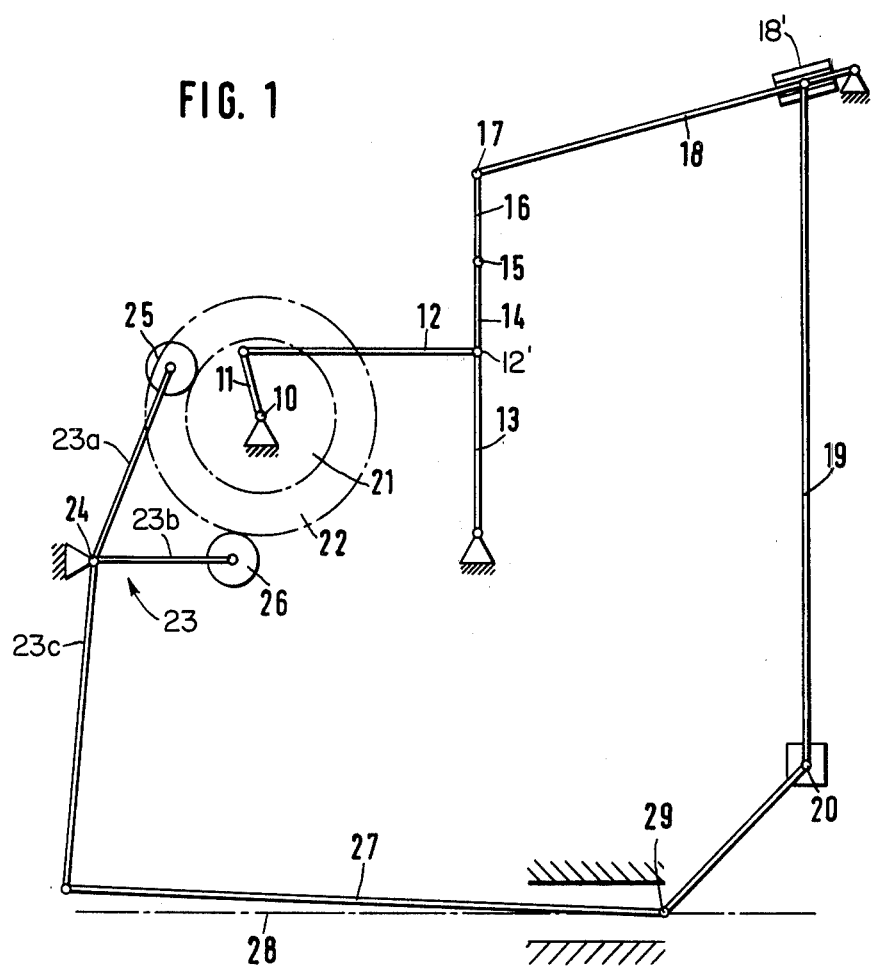
FIG. 1 is a schematic side view which shows the principle members of an articulated drive constructed in accordance with the present invention.

Referring now to the drawings wherein like reference numerals are used throughout the various views to designate like parts and, more particularly, to FIG. 1, according to this figure, an articulated drive arrangement for a stroke movement of an apparatus is provided and constructed as a quadrangular linkage which includes a crank 11 driven by a fixedly mounted rotatable drive shaft 10, a coupling member 12 is pivotally connected to the crank 11, and a rocker lever or arm 13 is pivotally connected at 12' to the coupling member 12. The rocker lever 13 includes an extension portion 14 projecting or extending beyond the pivot or coupling point 12'.

A link or connecting member 16 is provided for interconnecting the rocker lever 13 with a secondary drive lever 18 constructed as a single arm drive lever. For this purpose, one end of the link 16 is pivotally connected at 15 to the extension portion 14 with the other end of the link 16 being pivotally connected at 17 to the secondary drive lever 18.

A transmission link member 19 is arranged between a cutting unit 20 and a secondary drive lever 18 with the link member 19 serving to drive the cutting unit 20 in a working stroke direction. The link member 19 is connected to the secondary drive lever by way of an adjusting means 18'.

Two cams, 21, 22, fixed in rotation with the drive shaft 10, are provided for imparting a forward and backward stroke of the cutting unit 20. A three-armed lever generally designated by the reference numeral 23 is pivotally or swingably mounted at a fixed pivot point 24 with freely rotatable cam followers or rollers 25, 26 being arranged at free ends of respective first and second arms 23a, 23b with the cam followers 25, 26 cooperating with the outer peripheral surfaces of cams 21, 22, respectively. The arms 23a, 23b are disposed at an angle with respect to each other so that the cams 21, 22 and rollers 25, 26 constantly guide the movement of the lever 23. The third arm 23c of the three-armed lever 23 faces or is turned away from the arms 23a, 23b and is connected by way of a coupling rod 27 with a slide or carriage 29 supporting the cutting unit 20. The slide or carriage 29 is movable horizontally along a conveying level 28 of a feed of the strip material that is to be divided or severed.

The forward and backward stroke of the cutting unit 20 is such that during a preponderant part of the forward stroke of the cutting unit 20 a synchronization is obtained between the cutting unit 20 and the continuously moving strip of material to be divided in a manner disclosed more fully in U.S. Pat. No. 3,964,357.

Figure 2:
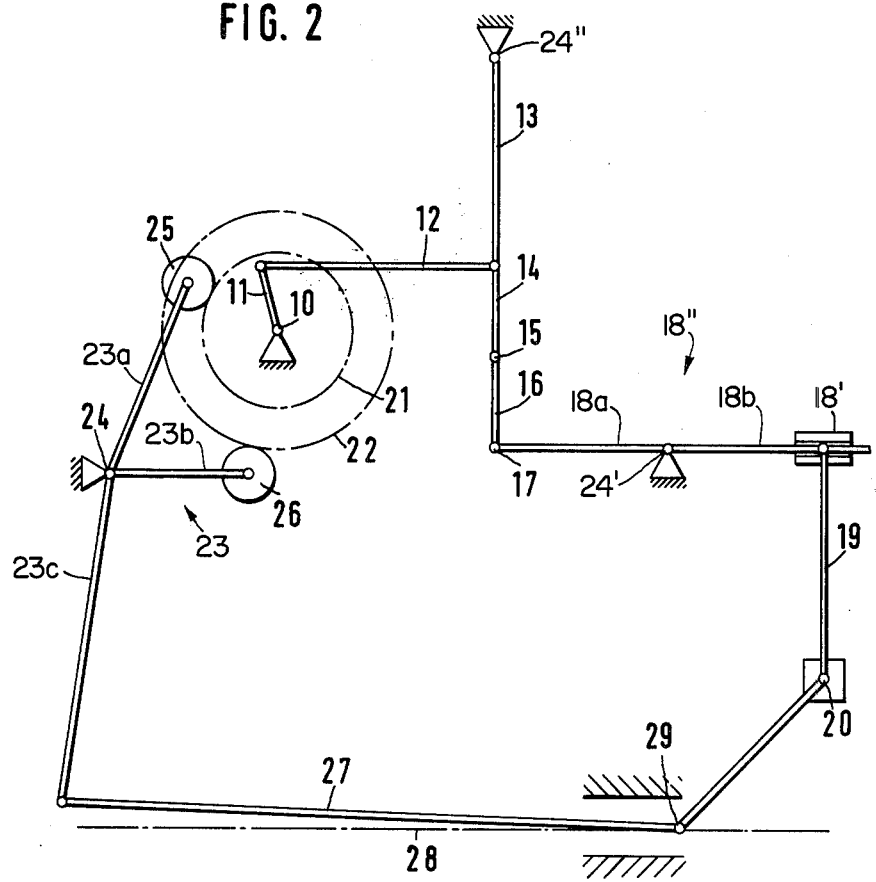
FIG. 2 is a schematic side view which shows the principle members of a further embodiment of an articulated drive constructed in accordance with the present invention.

As shown in FIG. 2, an articulated drive is provided wherein a secondary drive lever generally designated by the reference numeral 18' is constructed as a two armed lever consisting of arms 18a and 18b with the two-armed lever being pivotally connected at a fixed pivot point 24'. The rocker arm or lever 13 has one end thereof pivotally connected to a fixed pivot point 24" with the extension portion 14 of the rocker arm or lever 13 being pivotally connected at 15 to link 16 which, in turn, is pivotally connected at 17 to arm 18a of the double-armed lever 18". With regard to the remaining elements of the articulated drive of FIG. 2, such elements are arranged in the manner described hereinabove in connection with the embodiment of FIG. 1. By virtue of the stroke reversal by the two-armed secondary drive lever 18", the linkage quadrangle 11, 12, 14 is reversed so as to obtain the same motion relationship as obtained in connection with FIG. 1.

Figure 3:
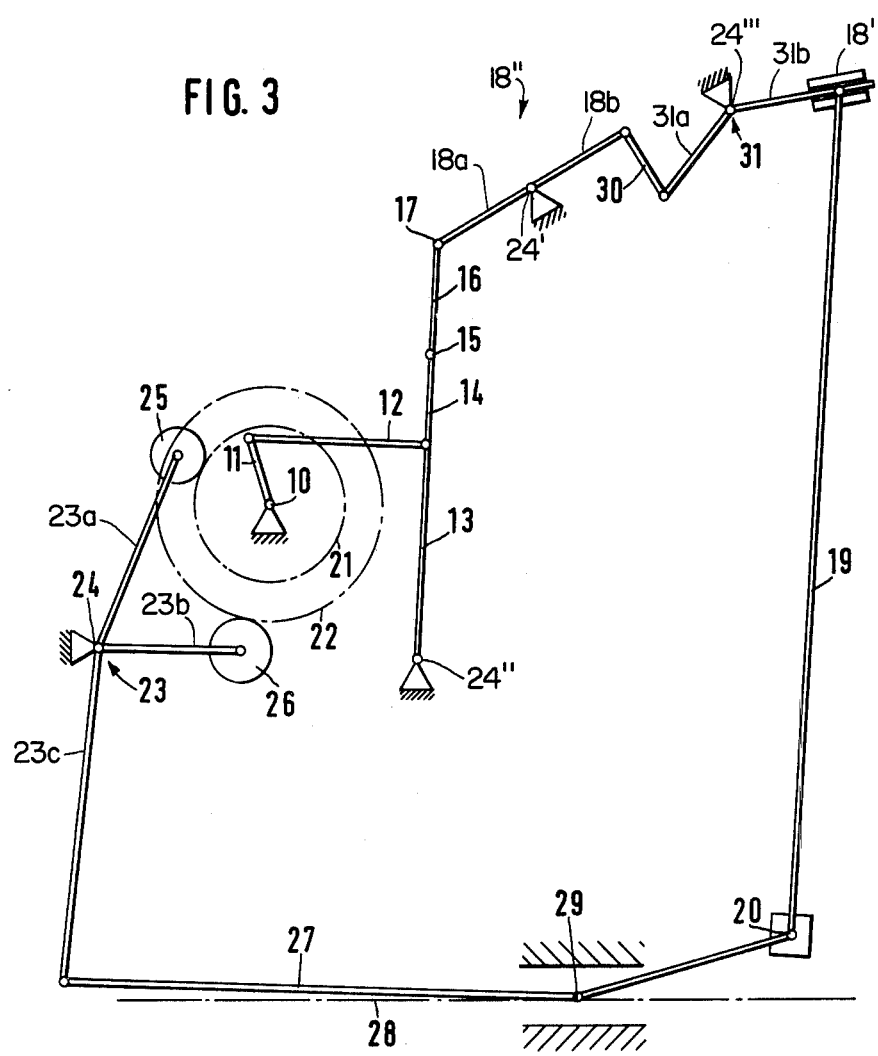
FIG. 3 is a schematic side view of another embodiment of an articulated drive constructed in accordance with the present invention.

As shown in FIG. 3, the two-armed lever 18" has a first arm 18a pivotally connected to link member 16 at 17 with the second arm 18b pivotally connected to one small link of a translation end 30. The other end of the translation link 30 is pivotally connected to a free end of an arm 31a of a two-armed lever generally designated by the reference numeral 31 which is pivotally mounted at a fixed pivot point 24'''. The other arm 31b of the two-armed lever is connected to the transmission link 19 which, in turn, is connected to the cutting unit 20. As with the embodiment of FIG. 2, the rocker arm or lever 13 has one end thereof pivotally connected at a fixed pivot point 24" with the connection of the two-armed lever with the transmission link 19 being provided by the translation link 30 and the double armed lever 31. The transmission link 19 is adjustable by way of the adjusting means 18' in its connection with the arm 31b of the two-armed lever 31. The remaining elements of the articulated drive of FIG. 3 are arranged in the manner described hereinabove in connection with the embodiment of FIG. 1.

Figure 4:
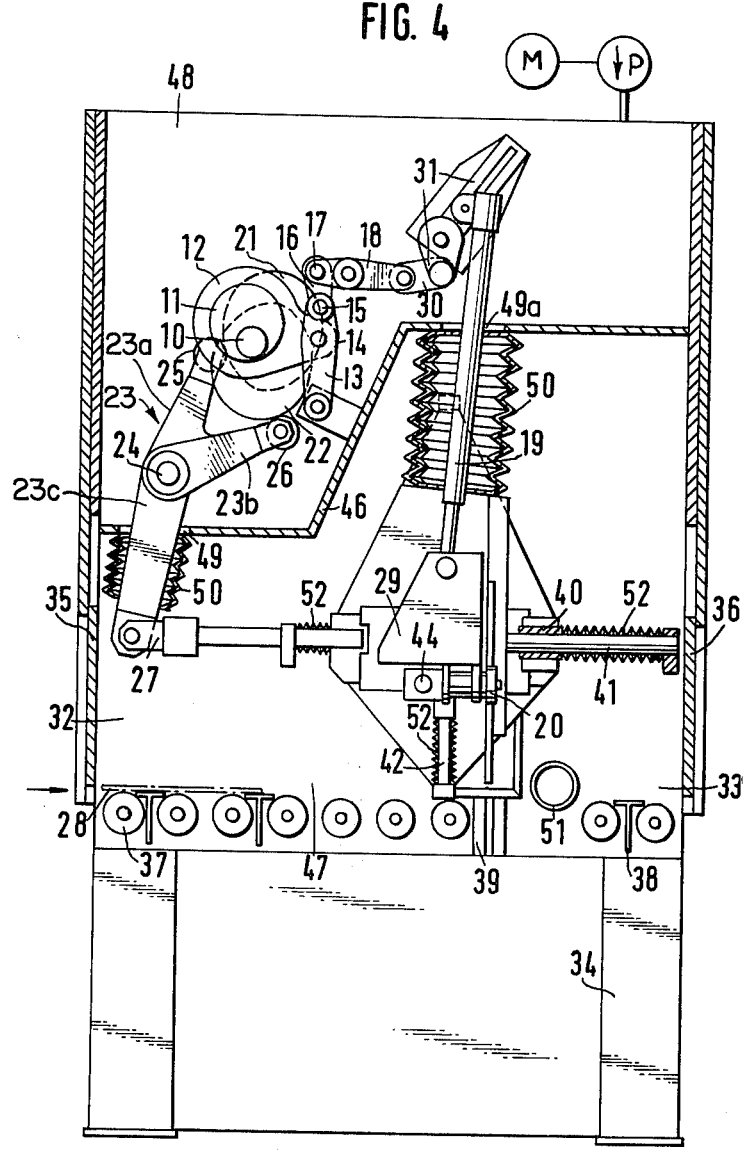
FIG. 4 is a partially schematic cross-section side view of a dividing apparatus employing the articulated drive of FIG. 3.
Figure 5:
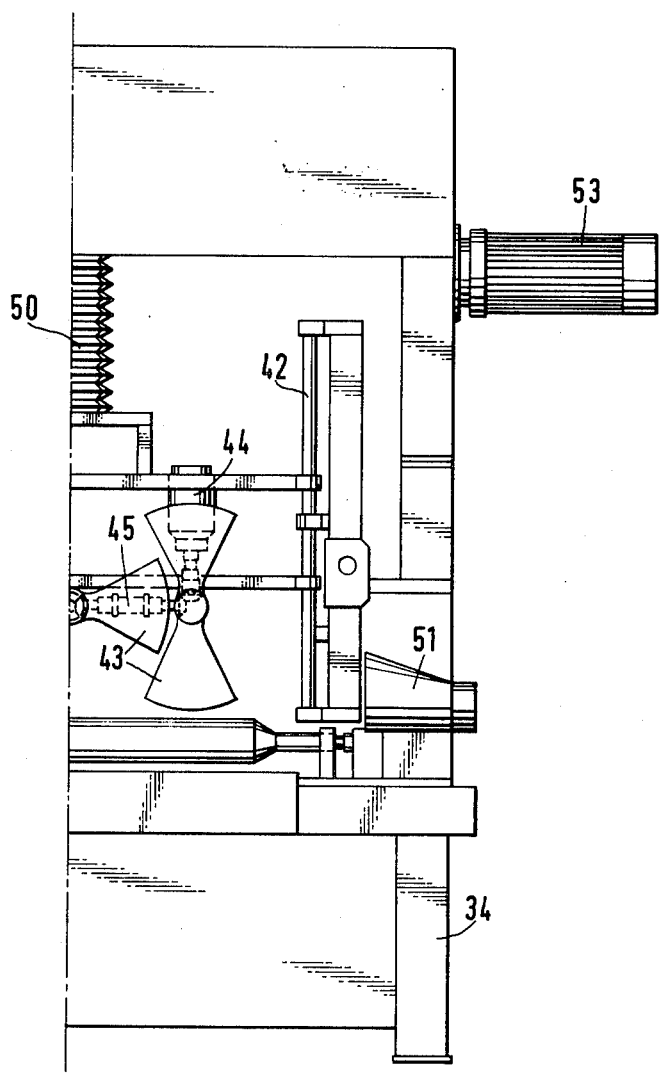
FIG. 5 is a partial cross-sectional view of a detail of the dividing apparatus of FIG. 4.

A dividing apparatus is provided in FIGS. 4 and 5 which includes a flying saw which incorporates the articulated drive of FIG. 3 with a drive for the forward and backward stroke of the flying saw being of the type disclosed in U.S. Pat. No. 3,964,357.

As shown most clearly in FIG. 4, a flying saw is mounted in a completely closed frame 34 which is provided with inlet and outlet openings 32, 33, respectively for permitting entry and discharge of the continuously fed strip material which is to be cut or divided by the flying saw. Adjustable covers 35, 36 are provided for the inlet and outlet openings 32, 33 so as to cover as much of the openings as possible whereby the respective openings 32, 33 correspond to the thickness of the material to be cut or divided. Conveyor rollers 37 define the conveyor level 28. The conveyor rollers 37 are arranged transverse to the direction of travel of the strip material between partly T-shaped supporting members 38 disposed at opposite sides of the frame 34. A supporting table that moves synchronously with the cutting unit 20 is arranged below the conveying level 28 in an area of the conveyor where the cutting or severing occurs. The supporting table 39 may be selectively heated by conventional means in dependence upon the type of material that is to be divided or severed.

The carriage 29 is guided by ball guide 40 on guide rolls 41 disposed on either side of frame 34, above and parallel to the conveying level 28. The ball guides 40 are connected by way of a coupling rod 27 with the arm 23c of the three-armed lever 23 so as to transmit a forward and backward stroke movement to the carriage 29. The carriage 29 is also provided with guide strips 42 at the sides thereof which guide strips extend vertically with respect to the conveying level 28. The cutting unit 20, driven by the transmission link 19, executes a desired working stroke between the guide strips 42.

As shown most clearly in FIG. 5, the cutting unit 20 is composed of three inter-engaging saw blades 43 and constructed like a Route fan, driven by two motors which are disposed symmetrically with respect to the carriage 29 with the fan being driven by suitable gear trains 45. By virtue of the construction of the inter-engaging saw blades 43, it is ensured that a small depth of penetration can be obtained with relatively wide strip material during a severing process.

As shown in FIG. 4, a partition or wall member 46 is arranged in the frame 34 so as to divide the interior thereof into a work compartment 47 and a drive compartment 48. Holes 49, 49a are provided through which one arm of the three-armed lever 23 and the transmission link 19, respectively, extend through the partition 46. Bellows or accordion-like covers 50 are provided and surround the arm 23c of the three-armed lever 23 and the transmission link 19 so as to shield the same. By this arrangement, waste that is produced during a severing operation, for example, chips, dust, etc., is prevented from entering the drive compartment 48 which entry would result in increased work in the drive elements. A suction device 51, of conventional construction, is arranged in the work compartment 47 for removing the waste material therefrom. Additional bellows or accodion-like sleeves or covers 52 are arranged at the guides 40, 41, 42 which are disposed in the work compartment 47. All the bellows 50, 52 are arranged so as to be displaceable with the carriage 29.

To further protect the drive compartment from the penetration of waste or dirt which results from the severing process, the drive compartment is constructed so that a supply of compressed air or the like may be directed from a suitable source which includes, for example, a motor driven pump, to the drive compartment so as to build up an excess pressure therein.

While FIGS. 4 and 5 provide an illustrated example of a flying saw employing the articulated drive of FIG. 3, it is understood that the articulated drive constructions of FIGS. 1 and 2 may also be applied to the flying saw construction illustrated in FIGS. 4 and 5.

As the shaft 10 is driven by means of a controlled electric motor 53 (FIG. 5), the cutting unit executes a motion indicated by the curves 54, 55 of FIG. 6 with the curve 54 showing a forward and backward stroke with a minimum working stroke while the curve 55 shows the forward and backward stroke of the cutting unit with a maximum working stroke. The curves 54, 55 have a bell configuration in both instances whereby the lower reversal point 56, with any stroke of the cutting unit as determined by the articulated drive 12, 13, 14, 15, 16, 17, 18, 30, 31, and 19 is at the same point whereas the upper reversal point 57, i.e., backward stroke, is continuously variable between two extremes in accordance with the stroke adjustment. The adjustment of the stroke itself, as already described with respect to FIGS. 1–3, occurs through the adjustable articulation of the transmission link on the arm of the secondary lever 18, arm 18b of secondary drive lever 18", or arm 31b of double-armed lever 31. The adjustment is advantageously effected by means of an electric motor (not shown).

While we have shown and described several embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A dividing apparatus for dividing or cutting a continuously running strip material, the apparatus including an articulated drive for a stroke movement of a cutting unit, the articulated drive being fashioned as a quadrangular linkage including a driven crank and a rocker lever pivotally connected to the driven crank through a coupling member, characterized in that the rocker lever includes an extension portion extending beyond a pivotal connection of the coupling member with the rocker lever, a secondary drive lever, a link member having a first end pivotally connected with said secondary drive lever and a second end pivotally connected with a free end of the extension portion, a transmission link means is provided for moving the cutting unit, means are provided for adjustably connecting said transmission link means with said secondary drive lever, in that the rocker lever, extension portion and link member assume an extended position over a first approximately 180° displacement of the driven crank and, over a second approximately 180° displacement of the driven crank, the rocker lever, extension portion and link member are deflected from the extended position, and in that during a total circular displacement of the driven crank, the rocker lever, extension portion, link member and secondary drive lever are moved out of a range of an extended position.

2. A dividing apparatus according to claim 1, characterized in that the secondary drive lever is constructed as a single-armed lever.

3. A dividing apparatus according to claim 1, characterized in that the secondary drive lever is constructed as a double-armed lever.

4. A dividing apparatus according to claim 3, characterized in that the means for adjustably mounting said transmission link means with said secondary drive lever includes a further double-armed lever and a translation link pivotally connected at one end thereof with one arm of the double-armed secondary drive lever and pivotally connected at a second end thereof with one arm of the further double-armed lever.

5. A dividing apparatus according to claim 4, characterized in that the transmission link means is adjustably connected with the second arm of the further double-armed lever.

6. A dividing apparatus according to claim 5, characterized in that a three-armed lever means is provided for controlling a forward and backward stroke motion of the cutting unit, a displaceably mounted carriage means is provided for accommodating the cutting unit, a coupling rod means is provided for coupling said carriage means with a first arm of the three-armed lever means, and in that cam means are operatively associated with a second and third arm of the three-armed lever means for causing a predetermined displacement of said carriage means.

7. A dividing apparatus according to claim 6, characterized in that guide means are provided on said carriage means for guiding a movement of the cutting unit with respect to said carriage means, said guide means extending vertically with respect to a conveying level of the strip material, and in that further guide means are provided for guiding the carriage means for horizontal displacement at a position above the conveying level of the strip material.

8. A dividing apparatus according to claim 7, characterized in that said further guide means includes guide rolls and ball guide means operatively associated with said guide rolls.

9. A dividing apparatus according to claim 6, characterized in that the drive crank and cam means are mounted on a common shaft and are fixed for rotation therewith.

10. A dividing apparatus according to claim 9, characterized in that an enclosed frame means is provided, a partition means is arranged in said frame means for dividing an interior of said frame means into a work compartment for accommodating at least the carriage means and cutting unit and a drive compartment for accommodating elements forming the articulated drive.

11. A dividing apparatus according to claim 10, characterized in that access means are provided in said partition means for permitting said first arm of said three-armed lever means and said transmission link means to extend into the work compartment, and in that means are provided for sealing said first arm and said transmission link in said work compartment to prevent waste material from passing from the work compartment through said access means into the drive compartment.

12. A dividing apparatus according to claim 11, characterized in that said sealing means includes bellows-type seals surrounding portions of said first arm and said transmission link means extending into the work compartment.

13. A dividing apparatus according to claim 8, characterized in that guide means are provided on said carriage means for guiding a movement of the cutting unit with respect to said carriage means, said guide means extending vertically with respect to a conveying level of the strip material, further guide means are provided for guiding the carriage means for horizontal displacement at a position above the conveying level, and in that means are provided for sealing said guide means provided on said carriage means and for sealing said further guide means.

14. A dividing apparatus according to claim 13, characterized in that said sealing means includes bellows-type sleeves surrounding said guide means and said further guide means.

15. A dividing apparatus according to claim 14, characterized in that said further guide means includes guide rolls and ball guides means operatively associated with said guide rolls.

16. A dividing apparatus according to claim 14, characterized in that a plurality of motor means are provided for driving the cutting unit through gear train means, said motor means being symmetrically disposed with respect to the carriage means.

17. A dividing apparatus according to claim 10, wherein means are provided for building up an excess pressure in the drive compartment.

18. A dividing apparatus according to claim 1, characterized in that an enclosed frame means is provided, a partition means is arranged in said frame means for dividing an interior of said frame means into a work compartment for accommodating at least the cutting unit and a drive compartment for accommodating elements forming the articulated drive.

19. A dividing apparatus according to claim 18, characterized in that access means are provided in said partition means for permitting at least some of the elements forming the articulated drive to extend into the work compartment, and in that means are provided for sealing at least portions of the elements extending in the work compartment to prevent waste material from passing from the work compartment through said access means into the drive compartment.

20. A dividing apparatus according to claim 19, characterized in that said sealing means includes bellows-type seals surrounding the portions of the elements of the articulated drive extending into the work compartment.

21. A dividing apparatus according to claim 1, characterized in that a three-armed lever means is provided for controlling a forward and backward stroke motion of the cutting unit, a displaceably mounted carriage means is provided for accommodating the cutting unit, the coupling rod means is provided for coupling said carriage means with a first arm of the three-armed lever means, and in that cam means are provided operatively associated with a second and third arm of the three-armed lever means for causing a predetermined displacement of said carriage means.

22. A dividing apparatus according to claim 21, characterized in that the drive crank and cam means are mounted on a common shaft and fixed for rotation therewith.

23. A dividing apparatus according to claim 21, characterized in that guide means are provided on said carriage means for guiding a movement of the cutting unit with respect to said carriage means, said guide means extending vertically with respect to a conveying level of the strip material, and in that further guide means are provided for guiding the carriage means for a horizontal displacement at a position above the conveying level of the strip material.

24. A dividing apparatus according to claim 21, characterized in that a plurality of motor means are provided for driving the cutting unit through gear train means, said motors being symmetrically disposed with respect to said carriage means.

* * * * *